United States Patent [19]

Kanner

[11] Patent Number: 5,285,360
[45] Date of Patent: Feb. 8, 1994

[54] AUTOMOTIVE HEADLAMP ADJUSTER

[75] Inventor: Rowland W. Kanner, Guntersville, Ala.

[73] Assignee: Textron Inc., Providence, R.I.

[21] Appl. No.: 808,097

[22] Filed: Dec. 16, 1991

[51] Int. Cl.$^5$ .............................................. B60Q 1/06
[52] U.S. Cl. ...................................... 362/66; 74/89.17; 362/419
[58] Field of Search ................. 362/66, 67, 69, 419, 362/421; 74/89.17

[56] References Cited

U.S. PATENT DOCUMENTS

| | | | |
|---|---|---|---|
| 4,843,523 | 6/1989 | Nakamura | 362/69 |
| 4,980,804 | 12/1990 | Dobler | 362/69 |
| 5,023,759 | 6/1991 | Eckenrode | 362/66 |
| 5,067,052 | 11/1991 | Suzuki et al. | 362/419 X |
| 5,163,746 | 11/1992 | Lisak | 362/66 |
| 5,186,532 | 2/1993 | Ryder et al. | 362/66 |

Primary Examiner—Stephen F. Husar
Attorney, Agent, or Firm—Trexler, Bushnell, Giangiorgi & Blackstone, Ltd.

[57] ABSTRACT

A mechanism for adjusting the orientation of vehicle headlamps includes a gear structure coupled to an adjusting member adapted for securement to the headlamp so that rotation of the gear structure imparts linear movement to the adjusting member which adjusts orientation of the headlamp. The adjusting member can be either a translating rack or a drive screw and the preferred drive structure includes a worm drive gear which drives an adjusting gear operatively engaged to provide translation of the rack or the screw. The adjusting member can provide locking of two housing portions which enclose the gear structure. Prevailing torque on the gears as well as the adjusting member can be provided by the locking action of the adjusting member or a drive shaft extending from the drive gear.

17 Claims, 5 Drawing Sheets

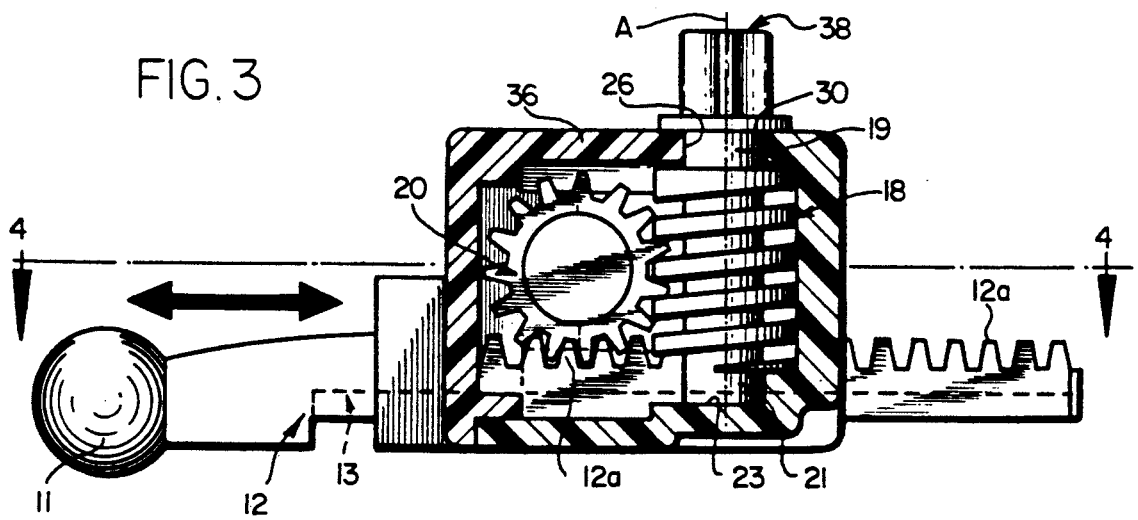
FIG. 3
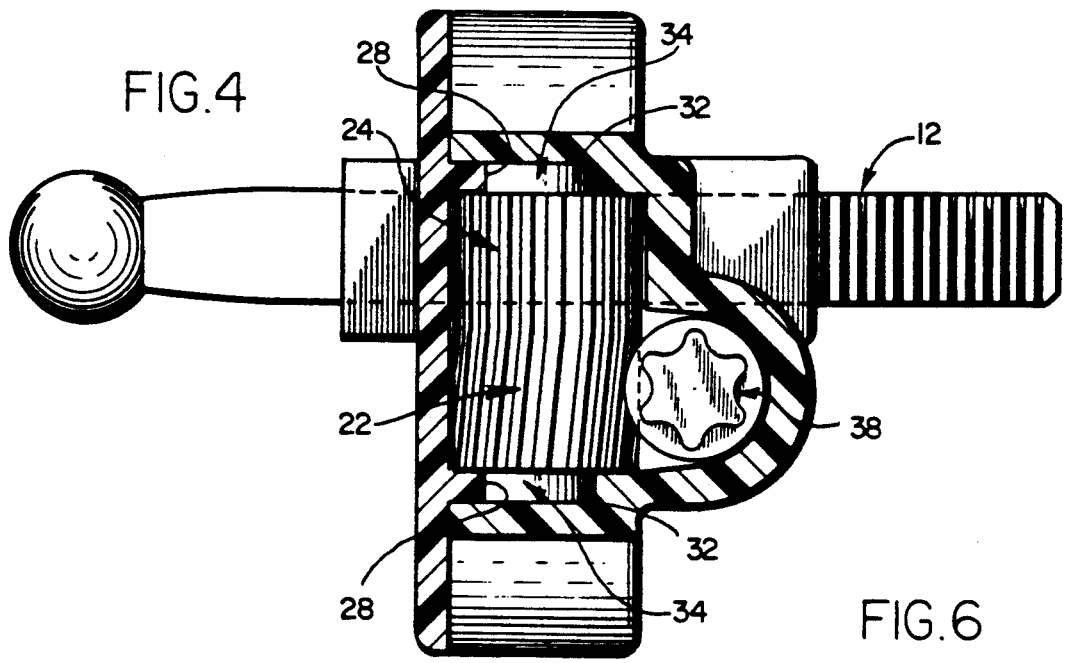
FIG. 4
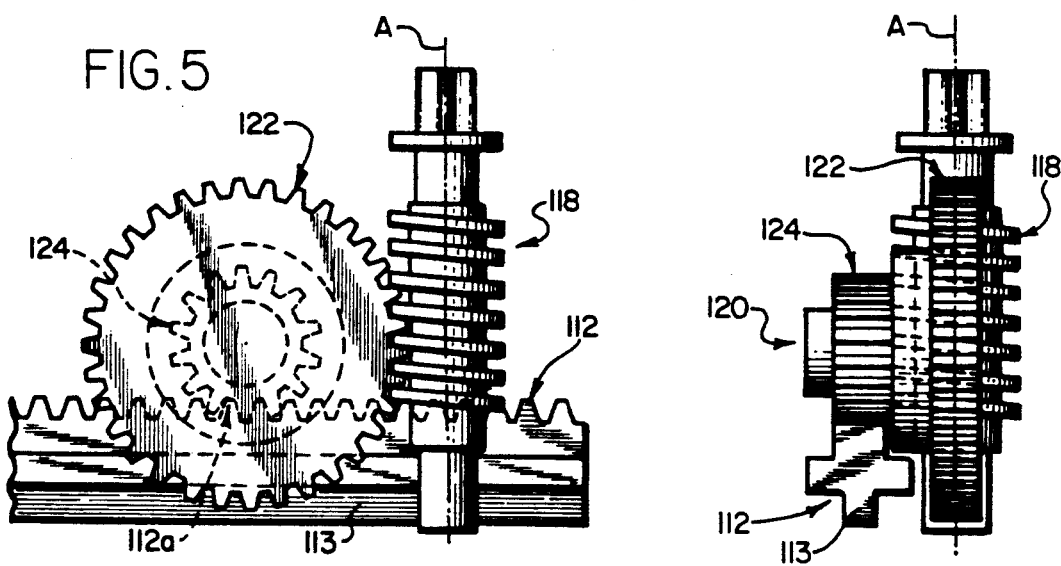
FIG. 5
FIG. 6

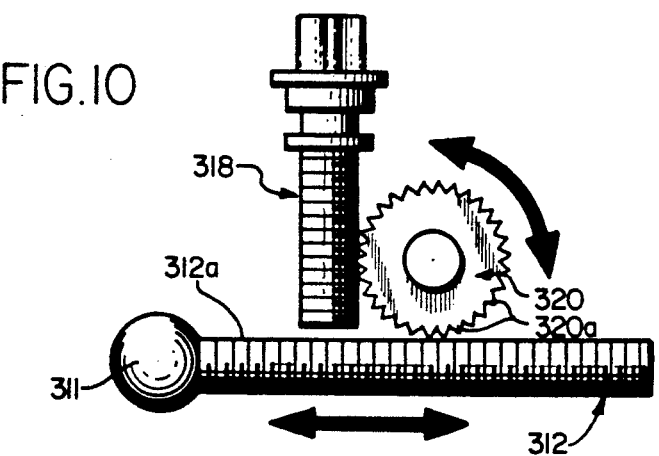
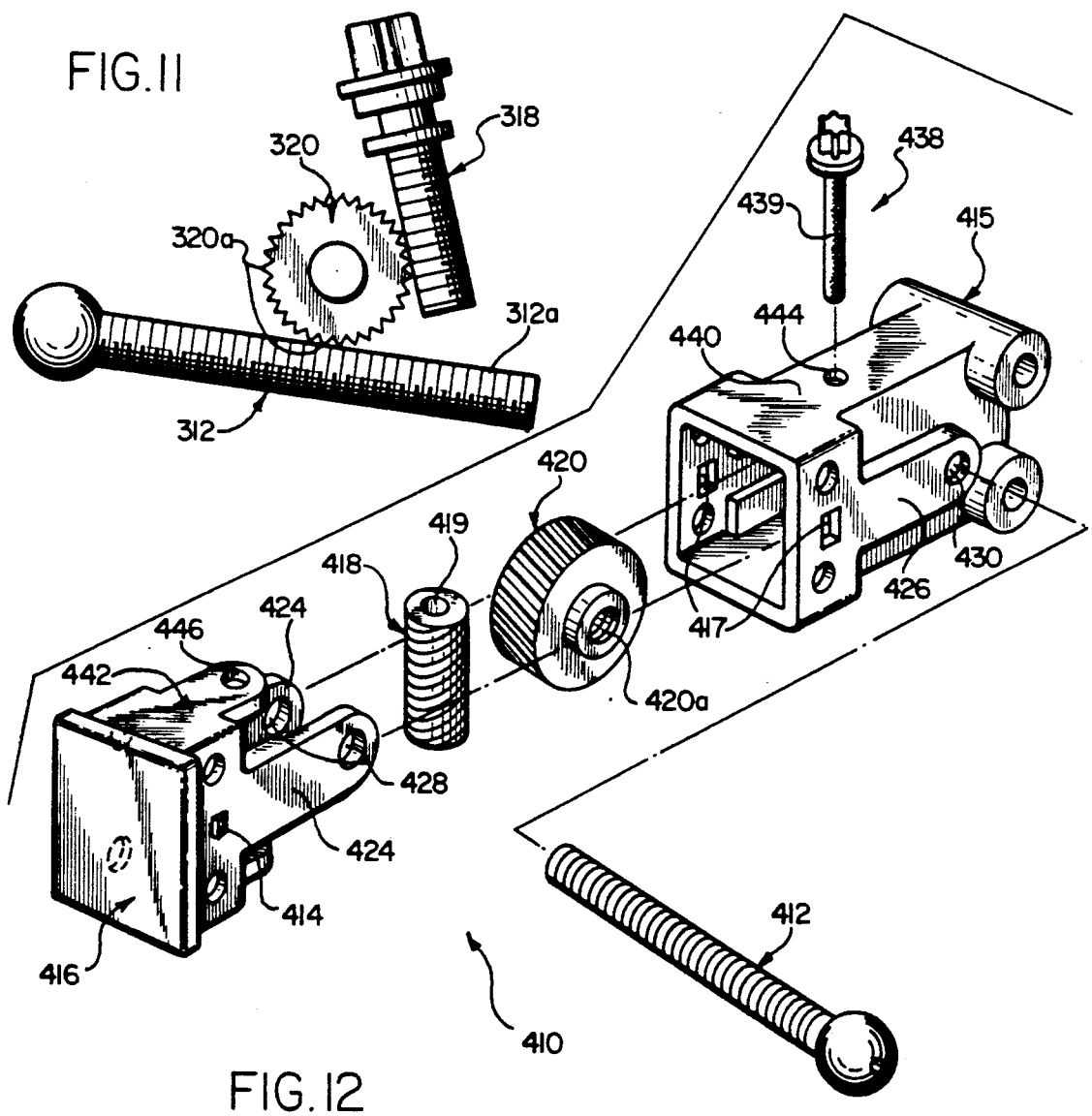

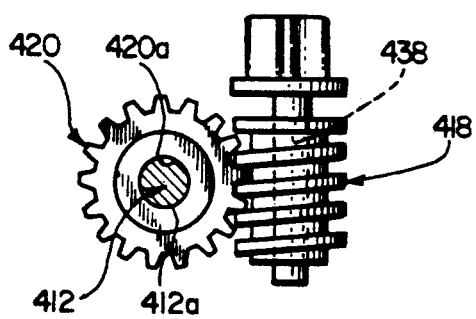
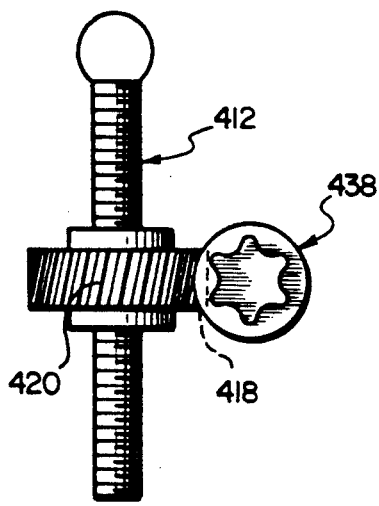
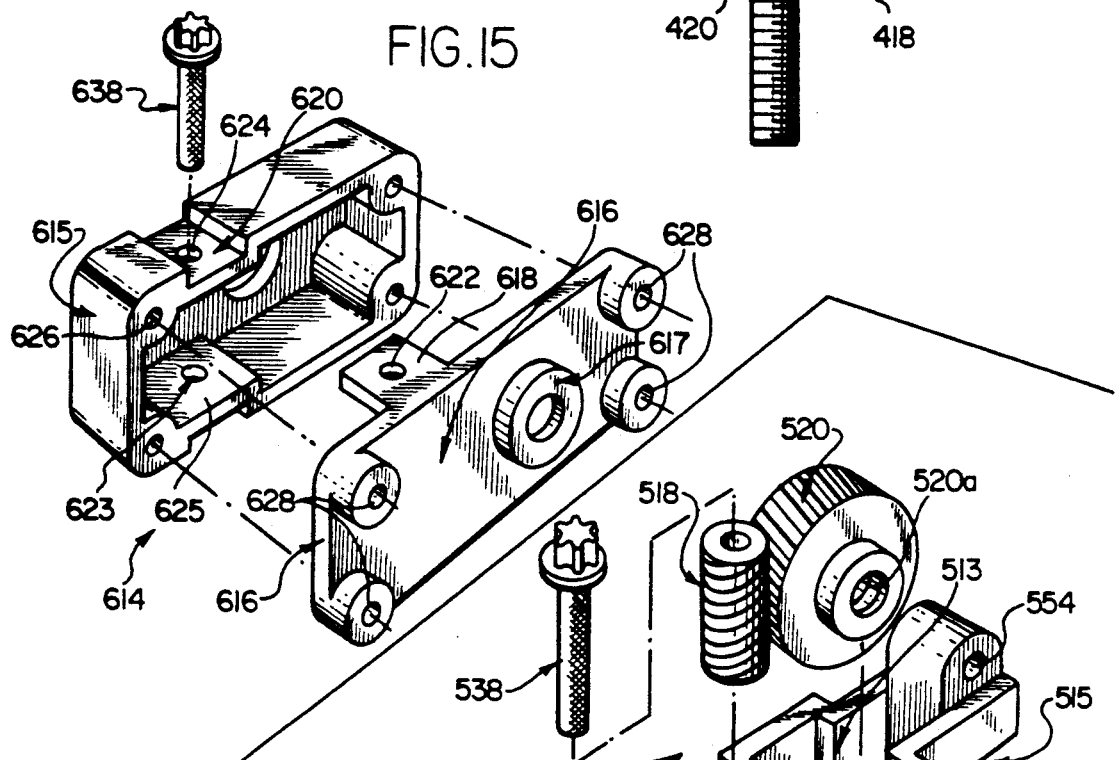
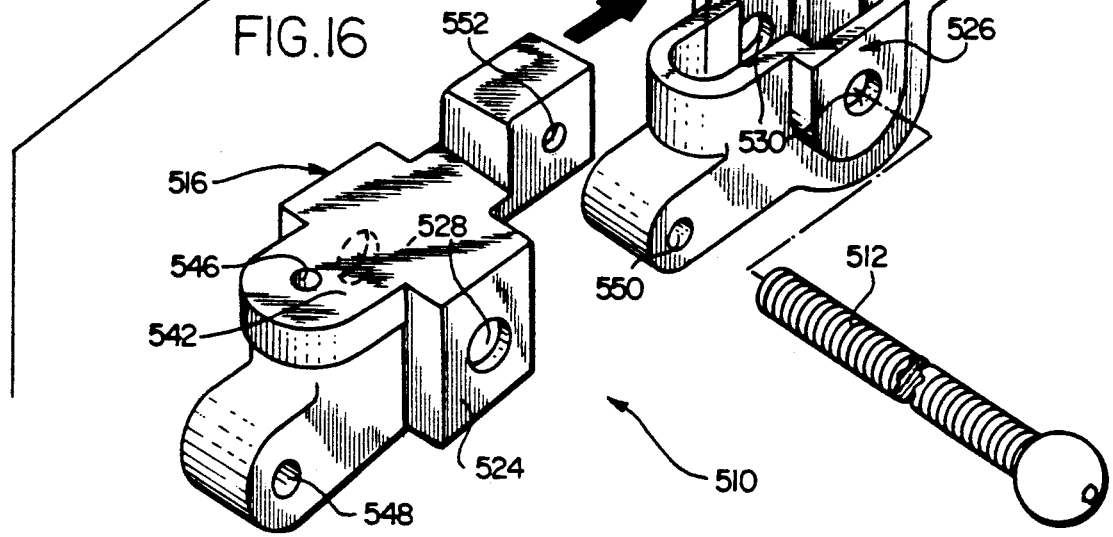

AUTOMOTIVE HEADLAMP ADJUSTER

BACKGROUND OF THE INVENTION

The present invention relates to adjusting mechanism particularly for alignment of automobile headlamps, and more specifically relates to an improved assembly and construction of such mechanisms.

Successful modern adjusting mechanism for vehicle headlamps are described for example in U.S. Pat. Nos. 4,674,018, 4,689,725 and 4,893,219. In the described mechanisms, an adjusting screw is coupled to the headlamp housing and extends into a gear box or adjustment mechanism. The adjusting screw is operatively coupled to an adjusting drive shaft which is operated by conventional hand tools. Movement of the adjusting screw is attained by means of a pair of mitered gears and a threaded connection. One gear is coupled to and driven by a drive shaft, while the other gear is operatively associated with the adjusting screw which is held against rotation. As such, rotation of the drive shaft produces linear movement of the drive screw as is well known in the art.

The gear members can be assembled and sealed within the integral adjuster housing, while allowing the drive shaft and adjusting screw components to be assembled at a later time with a variety of shaft and screw lengths as required for different model automobiles. The adjusting screw is prevented from rotating so that its motion is limited to linear translation to pivot the headlamp housing to a desired orientation. Adjustment mechanisms in accordance with the present invention enable improved performance, construction and assembly of automobile headlamps.

SUMMARY OF THE INVENTION

In accordance with the present invention, a mechanism for adjusting the orientation of vehicle headlamps includes a gear structure coupled to a translating rack or drive screw forming an adjusting member adapted for securement to the headlamp, so that rotation of the gear structure imparts linear movement to the adjusting member which in turn adjusts the orientation of the headlamp. In a preferred embodiment, the structure includes a worm drive gear which drives an adjusting gear member operatively engaged to produce translating movement of an adjusting member in the form of a rack. The adjusting gear member has two gear segments one of which is driven by the worm gear and the second segment directly engaged with the rack. As such, the dual gear segments can achieve variable torque multiplication and adjustment precision of the headlight alignment, determined by the gear ratio of the adjusting gear segments. Optionally, the adjusting gear can have a single arrangement of teeth having a pitch enabling mesh with both the worm drive gear and the rack teeth. The adjusting gear member enables either an offset or intersecting relationship between the axis of the worm drive gear and the linear path of the rack. In addition, the drive gear axis and the linear path of the rack can be either orthogonal or non-orthogonal.

In additional embodiments of the invention, an elongate adjusting screw is substituted for the rack. In one embodiment, the adjusting screw is threaded through an internal bore of the adjusting gear so that turning of the adjusting gear produces linear movement of the adjusting screw. In a second alternate embodiment, the adjusting gear is provided with an external gear tooth configuration that meshes with the external threads on the adjusting screw and drive the adjusting screw directly without the need of engaging the adjusting screw in an internally threaded bore. This is advantageous as it reduces the overall friction in the system. With these alternate embodiments, a gear housing is formed in two portions which have concentrically apertured overlapping walls through which either or both of a drive shaft or the adjusting screw itself projects to lock the housing portions in joined assembly, so that welding or adhesive joining of the housing portions is unnecessary. In addition to locking the assembly of the housing portions, the projection of the drive shaft or the adjusting screw through the overlapped housing portions also anchors and promotes prevailing torque on the meshed gears and screw threads to maintain correct gear alignment and vibrational resistance.

BRIEF DESCRIPTION OF THE DRAWINGS

FIG. 3 is a side elevational view, partially in section along a plane indicated by line 3—3 in FIG. 2;

FIG. 4 is a top plan view similar to FIG. 2 and partially in section along a plane indicated by line 4—4 in FIG. 3;

FIG. 5 is a side view of a modified gearing arrangement in a second embodiment of an adjusting mechanism in accordance with the present invention;

FIG. 6 is a front view of the modified gearing arrangement shown in FIG. 5;

FIG. 10 is a somewhat schematic side view of the gearing in the assembled adjustment mechanism shown in FIG. 9;

FIG. 11 is a schematic view similar to FIG. 10 showing modified orientation of the gearing relative to the adjusting member;

FIG. 12 is an exploded perspective view of a fifth embodiment of an adjusting mechanism in accordance with the present invention;

FIG. 13 is a front view of the gearing in the assembled adjustment mechanism shown in FIG. 12;

FIG. 14 is a top view of the gearing shown in FIG. 13;

FIG. 15 is an exploded perspective view of a housing for a seventh embodiment of an adjusting mechanism in accordance with the present invention; and FIG. 16 is an exploded perspective view of a sixth embodiment of an adjusting mechanism in accordance with the present invention.

DETAILED DESCRIPTION OF THE ILLUSTRATED EMBODIMENT

Figure 1:
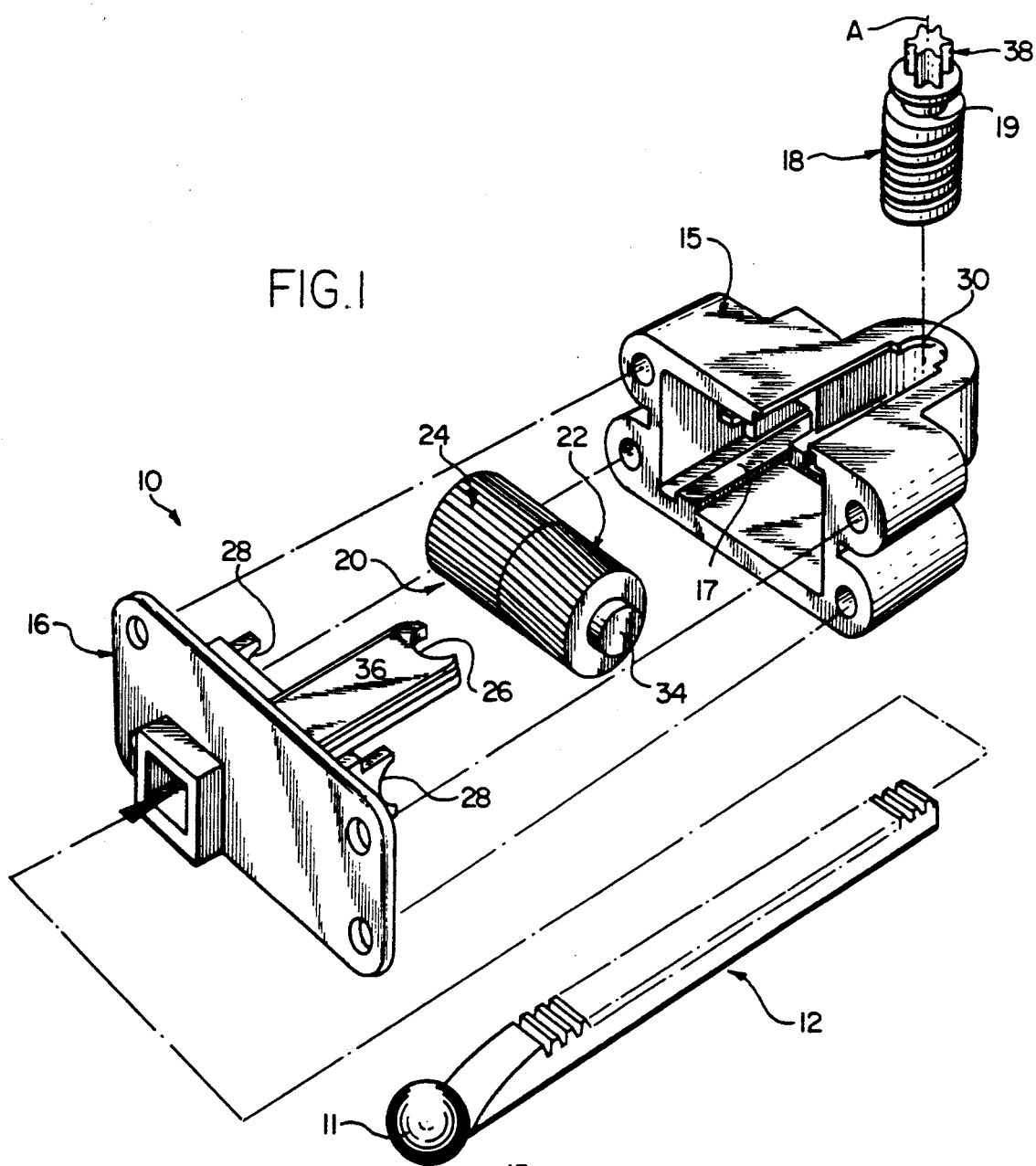
FIG. 1 is an exploded perspective view of a first embodiment of an adjustment mechanism in accordance with the present invention.
Figure 2:
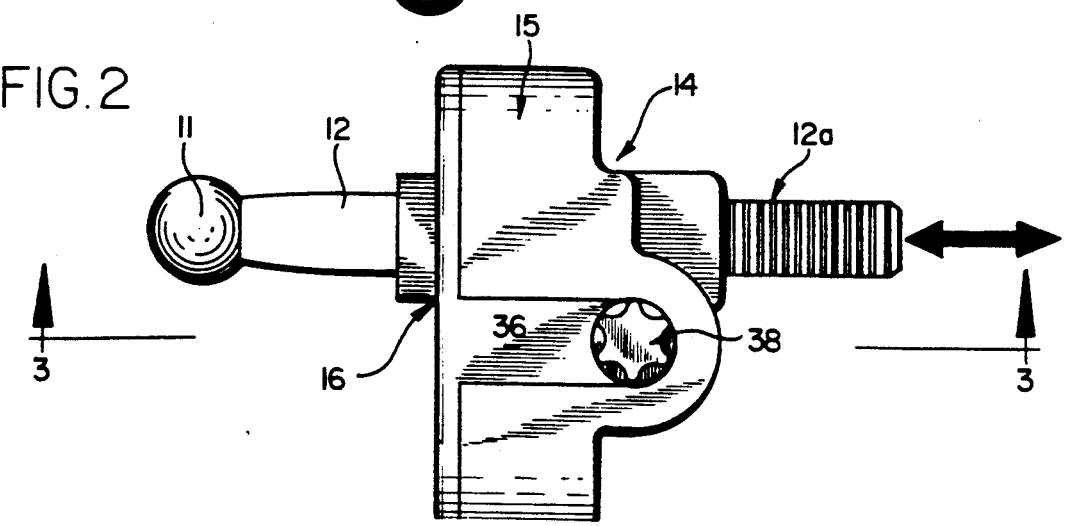
FIG. 2 is a top plan view of the assembled adjustment mechanism shown in FIG. 1.

Referring to FIGS. 1 and 2, an embodiment of an adjusting mechanism according to the invention, designated generally by reference character 10, includes an adjusting rack 12 which projects from and moves linearly through a gear housing 14 formed by joined housing portions 15 and 16. The end of the adjusting rack 12 has a coupling ball 11 which is coupled to the housing of a headlamp (not shown) in a known manner, so that the linear motion of the rack 12 driven by the mechanism 10 causes pivotal movement of the headlamp assembly to adjust vertical or horizontal alignment thereof, as is known in the art and as is fully described in the aforementioned prior art patents.

The two gear housing portions 15 and 16 cooperate to provide journaled support for a screw or worm type drive gear 18 which is engaged with and drives a compound adjusting spur gear member 20, which gear member 20 has a segment thereof operatively meshed or engaged with the rack 12 to attain translatory movement thereof, as best shown in FIGS. 3–6. Referring again to FIG. 1, in the illustrated embodiment, the adjusting gear member 20 has two axially distinct gear segments 22 and 24; the cylindrical arrangement of teeth in the gear segment 22 are pitched for meshing with the thread on the drive screw gear 18, whereas the cylindrical arrangement of teeth in the gear segment 24 are aligned to mesh with the teeth 12a on rack 12 to serve as a pinion which translates the rack 12 without any rotative or twisting movement. The bottom of the rack 12 has a channel configuration 13 as shown in FIG. 3 which receives and rides upon an elevated guide strip 17 within the housing portion 15 which both guides the translation path of the rack 12 and further prevents twisting movement of the translating rack. Alternatively, the rack can have a downwardly projecting, elongate tongue 113 as shown in FIGS. 5 and 6 which rides in a guide groove (not shown) substituted for the guide strip 17 in the housing portion 15 of FIGS. 1–4.

The pinion gear segment 24 can have a variably dimensioned diameter relative to the gear segment 22; for example, as shown in the modified embodiment illustrated in FIGS. 5 and 6, the larger spur gear segment 122 enables low input torque applied to the worm gear 118 to be multiplied to yield high output torque on the pinion gear segment 124 transmitted to the rack 112. Also, this arrangement permits more precise control of the position of the rack. Also, as a result of the dual-segmented spur gear 120, more precise adjustments can be made in the headlight positioning than with the 1:1 ratio of miter geared adjustment mechanisms described in the aforementioned patents or with the gear member 20. Additionally, the smaller surface area in engagement between the pinion gear segment 20,120, and the rack teeth 12a,112a, in comparison to the threaded adjusting gear and adjusting screw employed in conventional adjusting mechanisms as described in the aforementioned patents, enables comparative reduction in the frictional resistance to movement of the respective components and translation of the rack 12,112. Both the worm gear 18,118 and dual-segment spur gear 20,120 have been molded from engineering plastic and are believed to be possessed of high reliability. As can be appreciated, the plastic gear mechanism not only is less expensive than metal gears but provides a comparative reduction in weight as additional benefits. Although the worm gear 18,118 and rack 12,112 are orthogonally arranged in the illustrated embodiments, a non-orthogonal relationship can be accommodated with suitable modification in structuring the housing, as is generally shown in FIG. 11. It will be appreciated by one skilled in the art, that instead of the relative arrangement as shown in FIGS. 5 and 6 for the gear segments 122 and 124, the size of the segments could be reversed. That is to say the portion 122 engaged with the drive screw 118 could be of a relatively small diameter, while the segment 124 engaged with the rack formed to a larger diameter. Thus, relatively small degrees of movement of the drive screw would result in substantial movement of the rack.

Referring again to the embodiment illustrated in FIGS. 1–4, the housing portion 16 has three internally projecting arcuate bearings 26 and 28,28. The arcuate bearing 26 cooperates with a similar, opposing arcuate bearing 30 formed in the housing portion 15 so that the arcuate bearings 26 and 30 provide annular journaling of the worm gear drive shaft portion 19 as best shown in FIG. 3. Similarly, as best shown in FIG. 4, the arcuate bearings 28,28 cooperate with opposing arcuate bearings 32,32 to annularly journal the respective opposite shaft ends 34,34 on the spur gear 22.

In addition, the arcuate bearing 26 surface forms the distal end of a tongue 36 projecting from the housing portion 16 which cooperates with the arcuate bearing portion 30 on the opposite housing section to capture the drive gear 18. As noted above, the drive gear 18 has a reduced diameter portion 19. The respective bearing portion 26 and 30 are engaged with the reduced diameter portion 19, FIG. 3, to fix the axial position of the drive gear 18 and hold it in place. The opposite end of the drive gear 18 includes a boss 21 that is received in a bore or seat 23 formed on the interior of housing 15. As such, the drive gear 18 is held in place, yet is free to rotate upon the application of driving torque thereto.

The degree of engagement between the reduced diameter or neck portion 19 and the bearings 26 and 30 can be controlled to produce a desired, controlled degree of frictional engagement, that in effect retards rotation of the drive screw 18 and imparts prevailing torque to the worm gear 18 and thus to the entire system, which prevailing torque can withstand operational vibration. The worm gear 18 includes a tool-application head 38 which has a multi-lobular configuration in a preferred TORX ® pattern for application of a corresponding tool (not shown) which provides the input torque on the worm gear 18 for the adjusting operation of the mechanism 10 to adjust the headlamp alignment. The degree of frictional engagement at the neck portion 19 is such that it can be overcome by the use of a force multiply tool.

Figure 7:
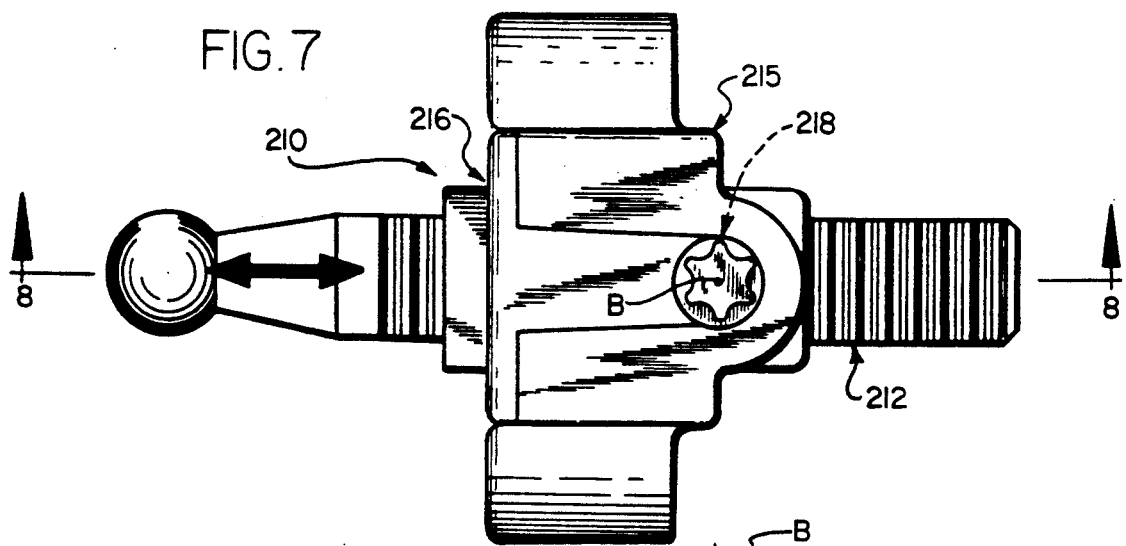
FIG. 7 is a top plan view of a third embodiment of an adjusting mechanism in accordance with the present invention.
Figure 8:
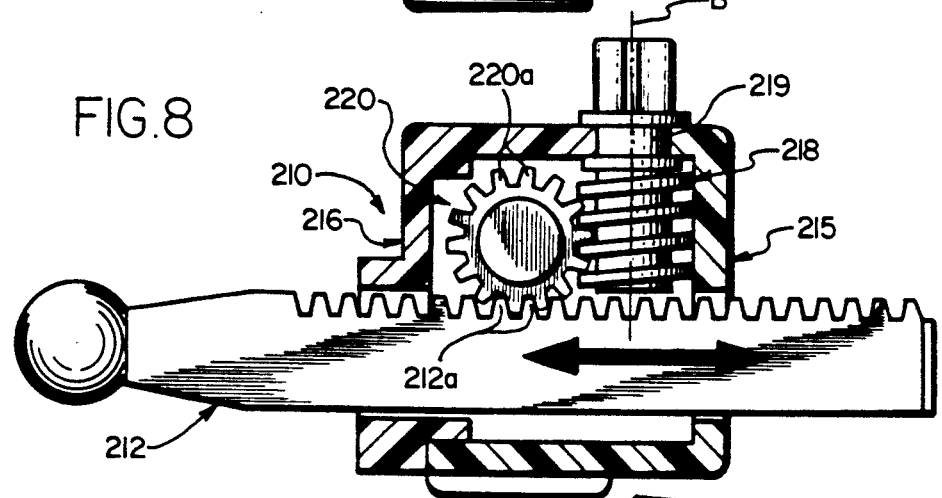
FIG. 8 is a side elevational view of the adjusting mechanism shown in FIG. 7, partially in section along a plane indicated by line 8—8 in FIG. 7.

In contrast to the dual segments of the adjusting gears 20 and 120 in the first two adjusting mechanism embodiments, in which the translational path of the rack 12 is in offset relation to the axis A of the drive gear 18 and 118, a third embodiment of an adjusting mechanism in accordance with the invention is shown in FIGS. 7 and 8 and designated 210 in which the axis B of the drive, worm gear 218 is in intersecting relationship with the translational path of the rack 212. In this embodiment, the spur or adjusting gear member 220 has only a single set of teeth 220a and the drive gear 218 is arranged directly above the rack 212. The teeth 220a of the adjusting gear member 220 have a pitch to enable meshed engagement with both the drive gear 218 and the rack teeth 212a and directly transmit the driving torque to the rack 212. The housing portions 215 and 216 cooperate to journal both gears 218 and 220 in a manner similar to that as discussed with the first two embodiments. The drive gear 218, however, is journaled only at the neck portion 219 and does not extend past the rack 212, as shown in FIG. 8.

Figure 9:
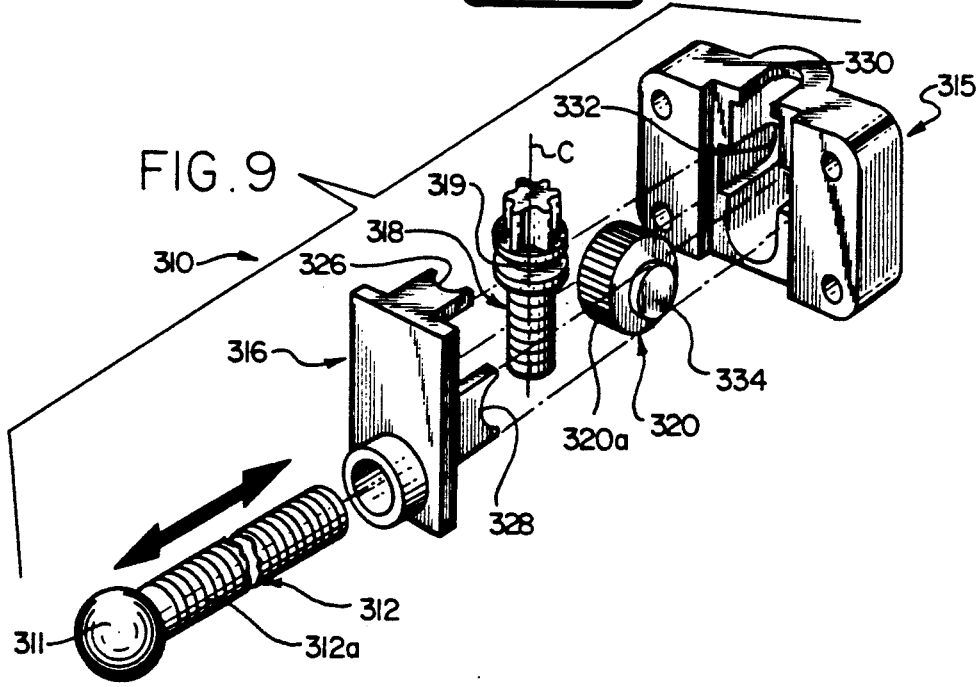
FIG. 9 is an exploded perspective view of a fourth embodiment of an adjusting mechanism in accordance with the present invention.

Referring now to FIGS. 9 and 10, a fourth embodiment of an adjusting mechanism 310 in accordance with the present invention is shown and generally designated by reference character 310. This fourth embodiment 310 has its respective components in orientation similar to the embodiment of FIGS. 7 and 8. The adjusting mechanism 310 includes two gear housing portions 315 and 316 which house a worm drive gear 318 which drives a meshed spur gear 320. The spur gear 320 is also tangentially engaged and meshed with the external thread on an adjusting screw 312 which is coupled by the ball end 311 to a headlamp housing (not shown) and translates to provide the pivotal adjustment of the headlamp alignment. In the adjustment mechanism 310, the drive gear 318 and adjusting gear 320 are arranged directly above the adjusting screw 312 as shown in FIG. 10 so that the axis C of the drive gear 318 intersects the screw 312 and its translational path. It should be noted that FIG. 10, and also FIG. 11 to be discussed, illustrates only schematically the engagement of the drive gear 318, adjusting gear member 320 and the thread on the adjusting screw member 312.

The housing portion 316 has internally projecting arcuate bearing surfaces 326 and 328,328 which respectively journal the shaft portion 319 of the drive gear 318 and the shaft ends 334 of the adjusting spur gear member 320, in cooperation with respectively opposing arcuate bearing surfaces 330 and 332,332 formed in the housing portion 315. As best shown in FIG. 10, the teeth 320a of the adjusting spur gear 320 have a reduced engagement surface with the thread 312A of the screw 312 in comparison to the internally threaded adjusting gear and screw described in the aforementioned patents.

While the drive gear 318 and adjusting screw 312 are arranged in orthogonal relationship as shown in FIG. 10, a modified arrangement in non-orthogonal relationship as shown in FIG. 11 can be attained. The arrangement is enabled by tangential meshing of the adjusting gear teeth 320a with both the drive gear 318 and adjusting screw 312 at any desired angle.

Referring now to FIGS. 12–14, a fifth embodiment of an adjusting mechanism in accordance with the present invention is generally designated by reference character 410. The adjusting mechanism 410 includes two gear housing portions generally designated 415 and 416, respectively, which houses a screw or worm drive gear 418 which drives an adjusting gear member in the form of a meshed spur gear 420. The spur gear 420 is referred to as the adjusting gear and has a central, internally threaded bore 420a in which an externally threaded adjusting screw projects and translates therethrough. The worm drive gear 418 and adjusting gear 420 are journaled within the housing portion 415 in a manner similar to that as described above. The housing portion 416 has a pair of spaced internally projecting walls 424,424 which are received within grooved pockets 426,426 (only one of which is shown in FIG. 12). The spaced walls 424,424 each have a through aperture 428,428 which are concentrically aligned with internally threaded bore 420a of the adjusting spur gear 420, as well as through apertures 430,430 formed through the grooved pocket structures 426,426. A pair of latch formations or snap-fit ears 414 project from the housing 416 and are snap-fitted into registering latch apertures 417 in the housing portion 415 to provide for retention of housing portions 415 and 416 together until subsequent locking is effected, as discussed hereinafter.

To assemble the adjusting mechanism 410, the adjusting spur gear 420 is inserted and journaled within the housing portion 415, after which the worm drive gear 418 can be laid into the housing 415 in proper mesh with the adjusting gear 420. Thereafter, the spaced walls 424,424 of the housing portion 416 are inserted into the overlapping pockets 426,426 of the housing portion 415. In order to secure the joining of the housing portions 415 and 416, the adjusting screw 412 is passed through the concentrically aligned aperture 430 and 428 and then threaded through the adjusting gear bore 420a until it passes through the concentrically aligned apertures 428 and 430 of the opposing, overlapping walls 424 and pocket 426; as a result of the threaded insertion, the adjusting screw 412 itself provides locked, joined engagement of the housing portions 415 and 416 which can only be disjoined by withdrawal motion transverse to the extension of the screw 412 therethrough. The screw 412 thus prevents withdrawal and disjoining of the overlapping walls as well as providing the prevailing torque to retain meshing of the drive gear 418 and adjusting gear 420 through which the adjusting screw 412 is threaded. The locking action by the threaded adjusting screw 412 thus eliminates the need for adhesive or other bonding of the housing portions, and also provides the prevailing torque to ensure that the mesh of the gears 418 and 420 is maintained and withstands vibration.

In addition, this embodiment of the adjusting mechanism 410 includes a drive shaft 438 which is separately fabricated from the drive gear 418 and passes entirely through an axial bore 419 in the gear 418; each of the housing portions 415 and 416 have overlapping outer walls 440 and 442, respectively, with respective through apertures 444 and 446 which are concentrically aligned with the gear bore 419 so that the drive shaft 438 passes through the housing portions 415 and 416 transverse to their disjoining motion before passing through the gear 418 and thus augments the locked joining of the housing portions 415 and 416 and the mesh of the gears 418 and 420. The drive shaft 438 has a knurled cylindrical surface 439 which bites into the wall of the gear bore 419 so that sufficient purchase and securement therebetween for co-rotation are obtained to ensure operation of the gear adjustment mechanism when the drive shaft is turned to adjust the headlamp alignment.

FIG. 16 illustrates an embodiment of the adjusting mechanism 510 which is similar to the mechanism embodiment 410 with the most important exception that the housing portion 515 in which the gears 518 and 520 are first inserted is itself substantially entirely received within the housing portion 516, and the drive shaft 538 passes through the gear access mouth 513 of the housing portion 515 after passing through the locking aperture 546 through the exterior wall 542 which closes the mouth 513. The adjusting screw 512 again passes through the respective overlapping sidewalls 526,526 and 524,524 and through the respective locking apertures 528,528 and 530,530 respectively to lock the joined housing portions 515 and 516 as the screw 512 is threaded through the adjusting gear bore 520a. Concentrically aligned mounting apertures 548,550 and 552,554 are peripherally arranged through the respective housing portions 515 and 516 for mounting the adjusting assembly 510 on a support panel of the vehicle.

Referring now to FIG. 15, a seventh embodiment of an adjustment mechanism housing in accordance with the present invention is designated generally by a reference character 614. The housing 614 is similar to a typical clam-shell configuration in which a first housing portion 615 houses a worm and spur gear arrangement (not shown) similar to that shown in FIG. 16, and a second housing portion 616 forms a cap which closes the housing portion 615 and cooperates with an apertured, annular recess 617 to journal the spur gear and allow translation of the adjusting screw (not shown) therethrough. In addition, the housing cap 616 has a projecting tongue 619 which is received within a groove 620 in the housing portion 615. The tongue 619 and groove 620 each have respective concentrically aligned apertures 622 and 624, respectively, which enable the through passage for the drive shaft 638 which thus locks together the housing portions 615 and 616. An aperture 623 in a bottom wall 625 of the housing portion 615 enables exit passage of the drive shaft to maintain rigid alignment of the shaft and the worm gears secured thereto as well as providing the prevailing torque to maintain vibrational resistance of the gear mesh. Thereafter, the peripherally arranged and concentrically aligned mounting apertures 626 and 628 in the respective housing portions 615 and 616 accept fasteners to complete securement of the housing portions in mounting the assembly 614 on a support panel (not shown).

In light of the foregoing description of the embodied adjusting mechanisms, modifications will be evident to those skilled in the design of such mechanisms and are within the broad scope of the appended claims.

I claim:

1. An adjusting mechanism particularly for use in alignment of a headlamp, comprising: gear means coupled to a translating rack having coupling means for securement to and for displacement of the headlamp, such that rotation of said gear means imparts linear movement to said rack for adjusting orientation of said headlamp.

2. An adjusting mechanism particularly for use in alignment of a headlamp, comprising: gear means coupled to a translating rack having coupling means for securement to and for displacement of the headlamp, such that rotation of said gear means imparts linear movement to said rack for adjusting orientation of said headlamp, wherein said gear means comprises a first, drive gear in driving engagement with a second, adjusting gear which is also engaged to translate said rack.

3. An adjusting mechanism according to claim 2 wherein said second, adjusting gear comprises a first gear segment meshed with said first, drive gear and a second gear segment engaged to translate said rack.

4. An adjusting member according to claim 3 wherein said first and second gear segments have different respective diameters.

5. An adjusting mechanism according to claim 2 wherein said second, adjusting gear comprises a plurality of gear teeth forming a continuous arrangement wherein a first group of said gear teeth is meshed with said first, drive gear and a second group of said gear teeth is meshed to translate said rack.

6. An adjusting mechanism according to claim 2, wherein said first, driving gear has an axis of rotation arranged in offset relation to a path of translation of said rack.

7. An adjusting mechanism according to claim 2 wherein said driving gear has an axis of rotation substantially intersecting a path of translation of said rack.

8. An adjusting mechanism according to claim 6 wherein said gear axis and rack path are in orthogonal relation.

9. An adjusting mechanism according to claim 6 wherein said gear axis and rack path are in non-orthogonal relation.

10. An adjusting mechanism according to claim 7 wherein said gear axis and rack path are in orthogonal relation.

11. An adjusting mechanism according to claim 7 wherein said gear axis and rack path are in non-orthogonal relation.

12. An adjusting mechanism particularly for use in alignment of a headlamp, comprising: gear means coupled to a translating rack adapted for securement to the headlamp, such that rotation of said gear means imparts linear movement to said rack for adjusting orientation of said headlamp, wherein said gear means comprises a first, drive gear in driving engagement with a second, adjusting gear which is also engaged to translate said rack and further comprising first and second housing portions joined to enclose said first, drive gear and second, adjusting gear.

13. An adjusting mechanism according to claim 12 wherein said first and second housing portions cooperate to provide journaling of both said first, drive gear and second, adjusting gear.

14. An adjusting mechanism according to claim 13 wherein said first, drive gear has a drive shaft projecting therefrom, and said first and second housing portions each include respective arcuate bearing surfaces which cooperate to circumferentially journal said drive shaft.

15. An adjusting mechanism according to claim 13 wherein said second, adjusting gear includes opposite shaft ends projecting therefrom, and said first and second housing portions include respective arcuate bearing surfaces which cooperate to circumferentially journal at least one of said shaft ends.

16. An adjusting mechanism according to claim 15, wherein said second, adjusting gear comprises a first gear segment meshed with said drive gear and a second gear segment engaged to translate said rack.

17. An adjusting mechanism particularly for use in alignment of a headlamp, comprising: gear means coupled to a translating rack adapted for securement to the headlamp, such that rotation of said gear means imparts linear movement to said rack for adjusting orientation of said headlamp, wherein said gear means comprises a first, drive gear in driving engagement with a second, adjusting gear which is also engaged to translate said rack and wherein said adjusting gear has an axis of rotation which is disposed transverse to the axis of translation of said rack.

* * * * *